(12) United States Patent
Kakadia et al.

(10) Patent No.: US 8,965,274 B2
(45) Date of Patent: Feb. 24, 2015

(54) SESSION CONTINUITY IN WIRELESS LOCAL AREA NETWORKS WITH INTERNET PROTOCOL LEVEL MOBILITY

(75) Inventors: Deepak Kakadia, Union City, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 269 days.

(21) Appl. No.: 13/550,209

(22) Filed: Jul. 16, 2012

(65) Prior Publication Data

US 2014/0017990 A1 Jan. 16, 2014

(51) Int. Cl.
*H04W 36/14* (2009.01)
*H04W 40/34* (2009.01)

(52) U.S. Cl.
CPC .............. *H04W 36/14* (2013.01); *H04W 40/34* (2013.01)
USPC ............. 455/7; 455/436; 455/13.1; 455/41.2; 370/338; 370/401

(58) Field of Classification Search
CPC ..... H04W 36/14; H04W 36/10; H04W 36/12; H04W 4/00; H04W 4/14; H04W 36/005; H04W 4/008; H04W 8/00; H04W 8/005; H04W 8/02; H04W 8/22; H04W 40/00; H04W 68/00; H04W 28/00; H04W 28/02
USPC ................. 455/7, 414, 41.2, 466, 456.3, 411, 455/414.1, 415, 420, 436, 437, 439, 13.1, 455/552.1, 401; 370/313, 338, 352, 230, 370/329, 469, 328; 709/219
See application file for complete search history.

(56) References Cited

U.S. PATENT DOCUMENTS

| | | | | |
|---|---|---|---|---|
| 7,831,600 | B2* | 11/2010 | Kilian | 707/737 |
| 2002/0173296 | A1* | 11/2002 | Nordman et al. | 455/414 |
| 2005/0073982 | A1* | 4/2005 | Corneille et al. | 370/338 |
| 2005/0075115 | A1* | 4/2005 | Corneille et al. | 455/456.3 |
| 2006/0039407 | A1* | 2/2006 | Grech et al. | 370/469 |
| 2007/0162912 | A1* | 7/2007 | Kilian | 719/313 |
| 2008/0025243 | A1* | 1/2008 | Corneille et al. | 370/313 |
| 2009/0161858 | A1* | 6/2009 | Goss et al. | 379/265.09 |
| 2011/0078285 | A1* | 3/2011 | Hawkins et al. | 709/219 |
| 2011/0276702 | A1* | 11/2011 | Marchev et al. | 709/228 |
| 2013/0155849 | A1* | 6/2013 | Koodli et al. | 370/230 |
| 2013/0155965 | A1* | 6/2013 | Koodli | 370/329 |

* cited by examiner

*Primary Examiner* — Tan Trinh

(57) ABSTRACT

A device may receive a request from a mobile device to create a socket connection between the mobile device and the device. The request may be associated with linking information that links the socket connection with a previous socket connection with the mobile device. The request may be received from the mobile device after the mobile device disconnects from a first wireless local area network and reconnects to a second wireless local area network. The device may identify, based on the linking information, a socket connection between the device and a server device, the socket connection between the device and the server device having been created when the mobile device was connected to the first wireless local area network. The device may relay communications between the mobile device and the server device, using the socket connections.

20 Claims, 10 Drawing Sheets

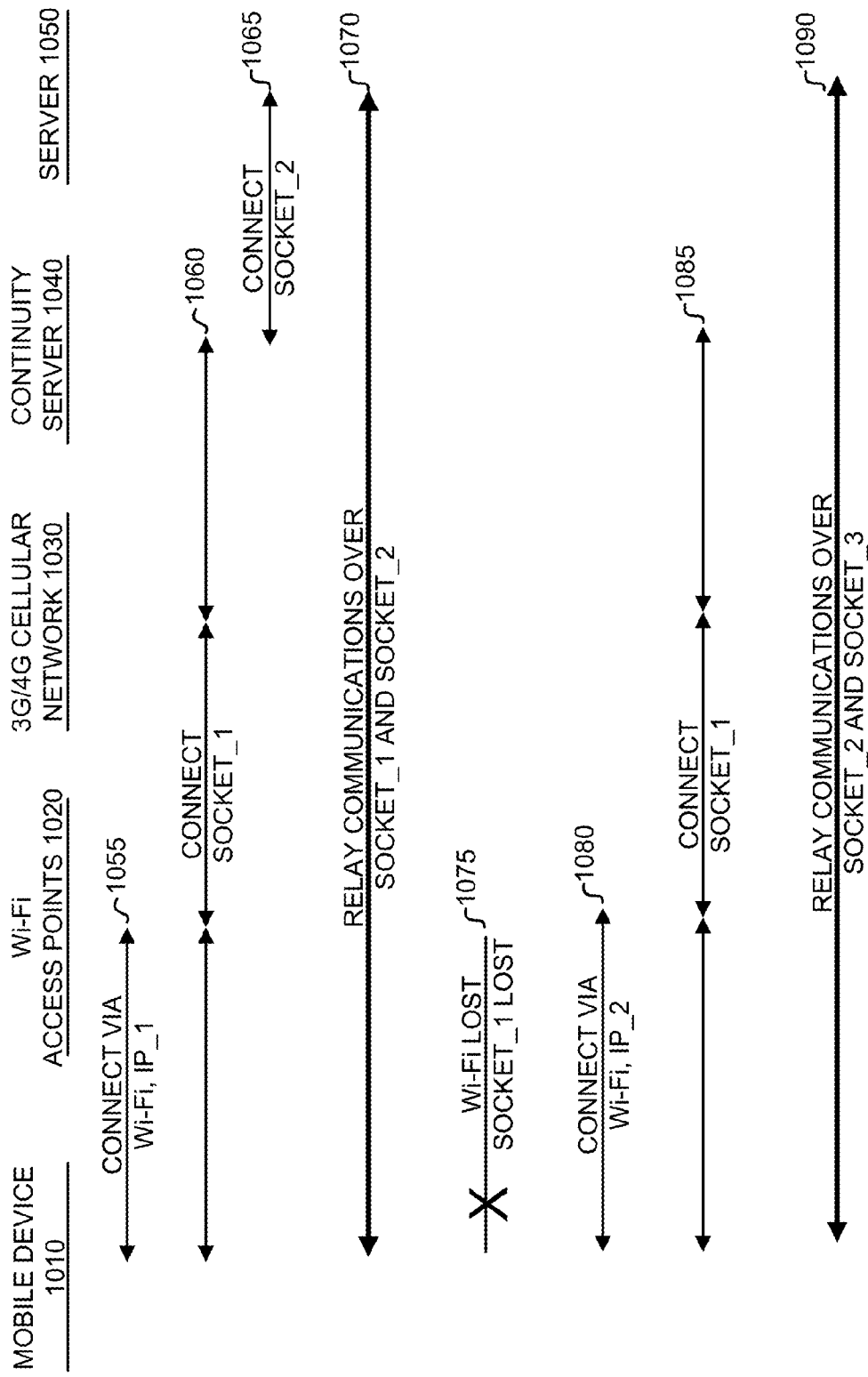

SESSION CONTINUITY IN WIRELESS LOCAL AREA NETWORKS WITH INTERNET PROTOCOL LEVEL MOBILITY

BACKGROUND

Mobile devices, such as smart phones and tablet computers, can connect to networks using a number of possible technologies. For example, a mobile device may obtain network connectivity by connecting to a cellular radio network, such as a 3G or 4G network. Mobile devices may also wirelessly connect to networks using other network technologies. For example, a mobile device may connect to a local wireless network using the Institute of Electrical and Electronics Engineers (IEEE) 802.11 family of standards, which are commonly referred to as Wi-Fi connections.

Wi-Fi connections may be provided by Wi-Fi access points, which may have a range limitation of about 20 meters when indoors. Different Wi-Fi networks may include coverage areas that are close to one another or that overlap one another.

When using a mobile device, users may prefer to obtain network connectivity, when possible, through Wi-Fi networks instead of through traditional cellular network coverage. For instance, Wi-Fi networks may provide for a higher bandwidth experience. Additionally, for some users, the network provider of the cellular radio network may limit the amount of data that a user can download in a billing period.

BRIEF DESCRIPTION OF THE DRAWINGS

FIGS. 9 and 10 are diagrams illustrating an example of communications relating to session continuity.

DETAILED DESCRIPTION OF PREFERRED EMBODIMENTS

The following detailed description refers to the accompanying drawings. The same reference numbers in different drawings may identify the same or similar elements.

Systems and/or methods described herein may provide session continuity for mobile devices that switch between wireless local area networks, such as Wi-Fi networks. Users of a mobile device may, while connected to a server through a logical connection referred to as a socket connection, travel out of range of one wireless local area network and into range of another wireless local area network. With current systems, this type of action may tend to break the socket connection to the server, which may undesirably disrupt or terminate the service that is being provided by the server.

Figure 1:
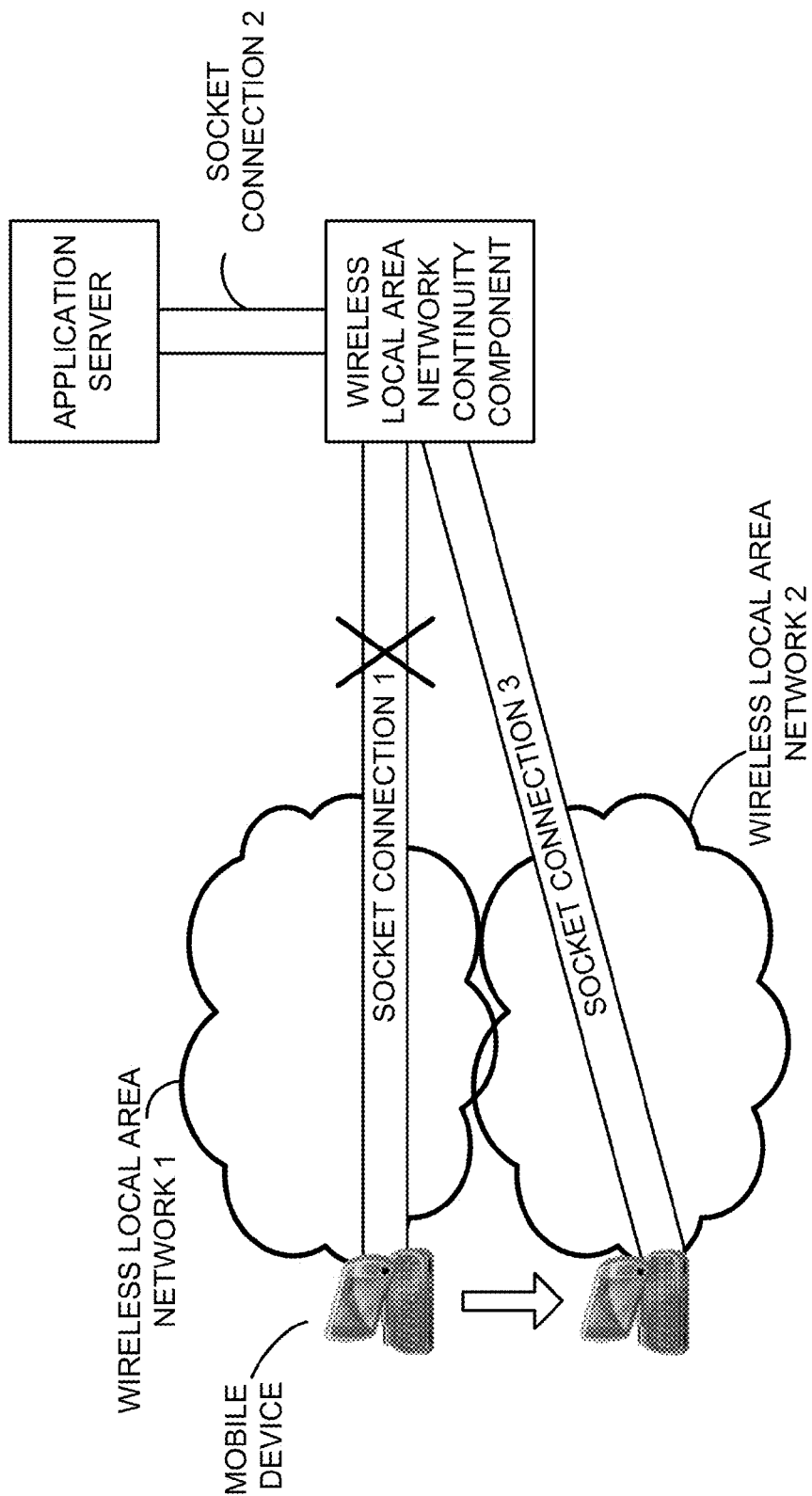
FIG. 1 is a diagram of an overview of an example implementation described herein.

FIG. 1 is a diagram of an overview of an example implementation described herein. As shown, a mobile device may obtain network connectivity by connecting to wireless local area networks, such as the wireless local area networks labeled as wireless local area network 1 and wireless local area network 2. Through the network connection, the user of the mobile device may obtain network services, such as services provided by an application server, which may include a web server or other type of server. The mobile device may connect to the server through a wireless local area continuity component, which may include a server or other device that acts to provide wireless local area session continuity when the mobile device switches wireless local area networks.

Referring to FIG. 1, assume that the mobile device is initially connected to wireless local area network 1 and further assume that the mobile device has initiated a connection to the wireless local area continuity component through a first socket connection (SOCKET CONNECTION 1). The wireless local area continuity component may act as a proxy to assist the mobile device in connecting to the application server. For example, the wireless local area continuity component may connect to the application server via a second socket connection (SOCKET CONNECTION 2) and relay communications to/from the mobile device from/to the application server.

At some point, assume that the mobile device moves out of range of wireless local area network 1 and into range of wireless local area network 2. At this point, wireless local area network 2 may assign the mobile device a new Internet Protocol (IP) address and the first socket connection may be broken (indicated by an "X" in FIG. 1). The mobile device may, however, initiate another socket session (SOCKET CONNECTION 3) with the wireless local area continuity component. The wireless local area continuity component may maintain, even during the period when the mobile device has disconnected from the first socket connection and not yet initiated the third socket connection, the second socket connection with the application server. From the point of view of the application server, the network session with the mobile device may not be interrupted. When the mobile device reconnects to the wireless local area continuity component, via the third socket connection, the wireless local area continuity component may recognize that the third socket connection is a continuation of the first socket connection, and may begin to relay communications, using the second and third socket connections, to/from the mobile device from/to the application server.

From both the user's perspective and the perspective of the application server, continuity of the network session between the mobile device and the application server may be maintained when the mobile device moves between wireless local area networks. Advantageously, user satisfaction, with the mobile device and/or the network services provided by the application server, may be improved.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
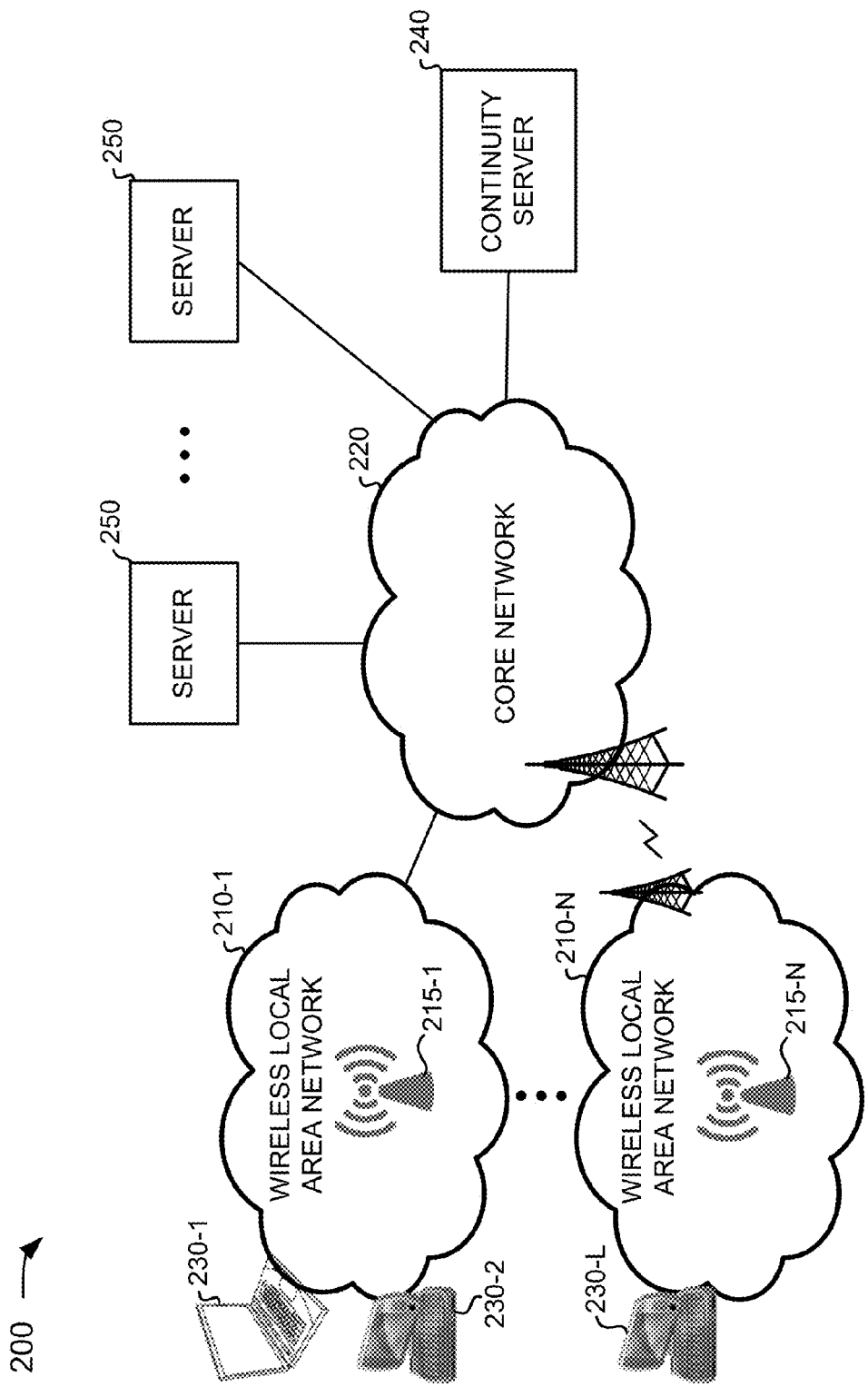
FIG. 2 is a diagram of an example environment in which systems and/or methods described herein may be implemented.

FIG. 2 is a diagram of an example environment 200 in which systems and/or methods described herein may be implemented. As illustrated, environment 200 may include wireless local area networks 210-1 through 210-N (N>1), a core network 220, mobile devices 230-1 through 230-L (L>0), a continuity server 240, and servers 250.

Wireless local area networks 210 may each include one or more wireless local area networks, such as networks based on the IEEE 802.11 standards (Wi-Fi). Wireless local area network technologies, other than Wi-Fi, can alternatively or additionally be used. Networks 210-1 through 210-N may each include, for example, one or more access points 215-1 through 215-N, that may implement the radio circuitry associated with a wireless local area network. Mobile devices 230 may occasionally lose network contact with an access point 215. For example, a mobile device 230 may lose network connectivity, to a wireless local area network 210, when the mobile device 230 moves outside the coverage area of an access point 215 or for other reasons (e.g., radio interference, access point failure, etc.).

Core network 220 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, a cellular network, or a combination of networks. In some implementations, core network 220 may include a cellular wireless network, to which mobile devices 230 may connect, such as a cellular 3G or 4G network. In some implementations, core network 220 may include a network designed to provide network connectivity to end users via wired connections, such as co-axial cable or fiber optic connections. In some implementations, core network 220 may represent a number of networks, such as both a wireless cellular network and a wired network. In the example implementation shown in FIG. 2, a first entity (e.g., a customer of a telecommunications service provider), associated with wireless local area network 210-1, may connect, via access point 215-1, to core network 220, via a wired connection. A second entity, associated with network 210-N, may connect, via access point 215-N, to core network 220, through a wireless connection, such as a 4G wireless broadband connection.

Mobile devices 230 may each include a portable computing and communication device, such as a personal digital assistant (PDA), a smart phone, a tablet computer, a cellular phone, a laptop with connectivity to a cellular wireless network, etc. Mobile devices 230 may connect, through a radio link, to wireless local area network 210 and/or core network 220.

Continuity server 240 may include one or more computation and communication devices that may provide network session continuity, for mobile devices 230, as mobile devices 230 transition between wireless local area networks 210. In some implementations, continuity server 240 may act as a proxy device between mobile devices 230 and servers 250. Mobile devices 230, instead of directly connecting, via a socket connection, to servers 250, may connect through continuity server 240, to servers 250. Continuity server 240 may maintain a first socket connection with a mobile device 230 and a corresponding second socket connection with a server 250. When the socket connection with mobile device 230 is broken, continuity server 240 may continue to maintain the socket connection with server 250, to thereby give mobile device 230 a chance to reconnect with continuity server 240. The operation of continuity server 240, in conjunction with mobile devices 230 and servers 250, will be described in more detail below.

Servers 250 may each include one or more computation and communication devices designed to provide services, over core network 220, to mobile devices 230. The services may include, for example, services relating to providing web pages, database services, or other services. In one example, a server 250 may implement a web server that provides hypertext markup language (HTML) documents to browsers at mobile devices 230. As another example, a server 250 may be an application server that provides data for a particular application, such as a custom application, that is implemented by mobile devices 230.

Although FIG. 2 shows example devices of environment 200, in other implementations, environment 200 may include fewer devices, different devices, differently arranged devices, or additional devices than depicted in FIG. 2. Alternatively, or additionally, one or more devices of environment 200 may perform one or more tasks described as being performed by one or more other devices of environment 200.

Figure 3:
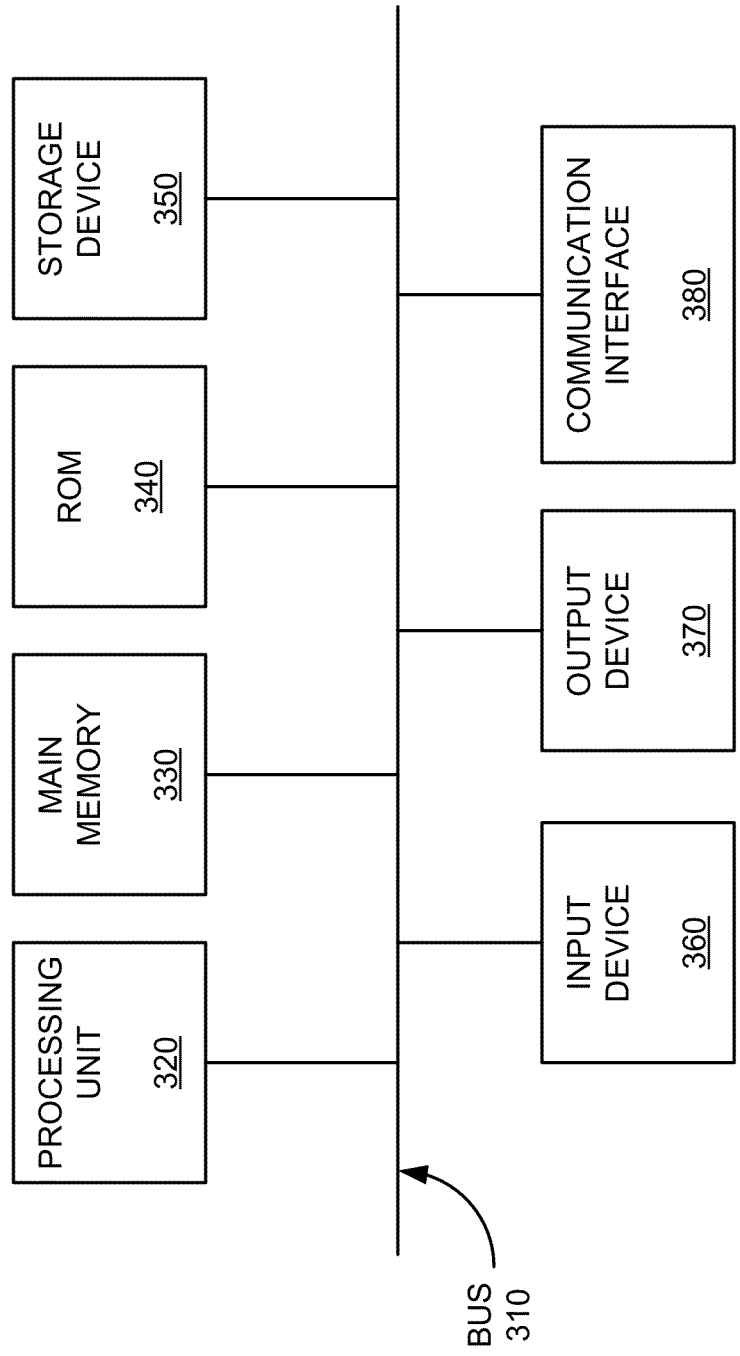
FIGS. 3 and 4 are diagrams of example components of devices that may correspond to one or more devices in the environment illustrated in FIG. 2.

FIG. 3 is a diagram of example components of a device 300 that may correspond to one or more devices in environment 200. For example, device 300 may correspond to continuity server 240 or server 250. In one example implementation, one server 240 and/or server 250 may include one or more devices 300 or one or more components of device 300. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive or a removable memory, such as flash memory.

Input device 360 may include a mechanism that permits an operator to input information to device 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
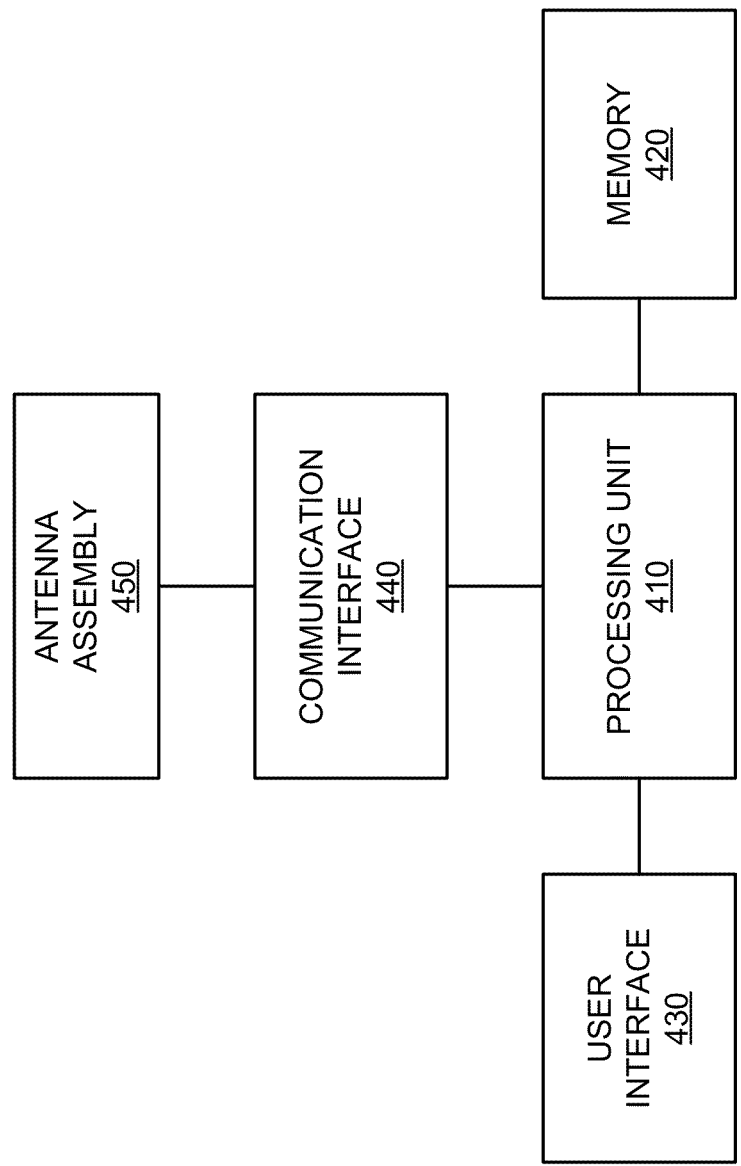

FIG. 4 is a diagram of example components of a device 400 that may correspond to, for example, a mobile device 230 or an access point 215. In one example implementation, mobile device 230 and/or access point 215 may include one or more devices 400 or one or more components of device 400. As illustrated, device 400 may include a processing unit 410, memory 420, a user interface 430, a communication interface 440, and/or an antenna assembly 450.

Processing unit 410 may include one or more processors, microprocessors, ASICs, FPGAs, or the like. Processing unit 410 may control operation of components of device 300 in a manner described herein.

Memory 420 may include a RAM, a ROM, and/or another type of memory to store data and/or instructions that may be used by processing unit 410.

User interface 430 may include mechanisms for inputting information to device 400 and/or for outputting information from device 400. Examples of input and output mechanisms might include buttons (e.g., control buttons, keys of a keypad, a joystick, etc.) or a touch screen interface to permit data and control commands to be input into device 400; a speaker to receive electrical signals and output audio signals; a microphone to receive audio signals and output electrical signals; a display to output visual information (e.g., text input into device 400); and/or a vibrator to cause device 400 to vibrate.

Communication interface 440 may include, for example, a transmitter that may convert baseband signals from processing unit 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and/or reception of the RF signals.

Antenna assembly 450 may include one or more antennas to transmit and/or receive RF signals over the air. Antenna assembly 450 may, for example, receive RF signals from communication interface 440 and transmit them over the air, and receive RF signals over the air and provide them to communication interface 440. In one implementation, for example, communication interface 440 may communicate with a network and/or devices connected to a network.

As will be described in detail below, device 400 may perform certain operations described herein in response to processing unit 410 executing software instructions of an application contained in a computer-readable medium, such as memory 420. The software instructions may be read into memory 420 from another computer-readable medium or from another device via communication interface 440. The software instructions contained in memory 420 may cause processing unit 410 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more other tasks described as being performed by one or more other components of device 400.

Figure 5:
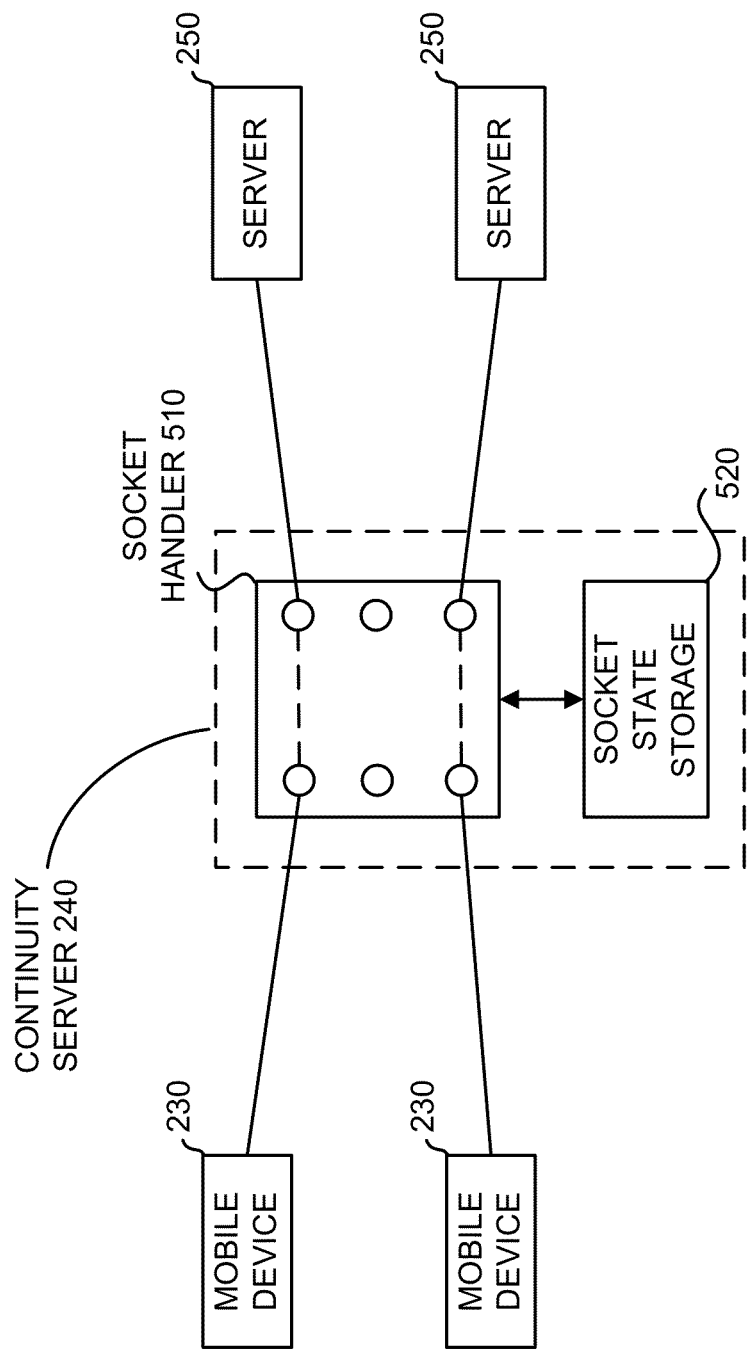
FIG. 5 is a diagram conceptually illustrating example components that may be included in the continuity server shown in FIG. 2.

FIG. 5 is a diagram conceptually illustrating example functional components that may be included in continuity server 240. As shown, continuity server 240 may include socket handler 510 and socket state storage 520.

Socket handler 510 may function to receive requests, from mobile devices 230, to create network sockets. The socket requests may be associated with a server 250. For example, socket handler 510 may receive a request from a mobile device 230 to create a first socket. After accepting the socket, socket handler 510 may further receive, from mobile device 230 and over the first socket connection, an indication of a server 250 to which mobile device 230 is to connect. Socket handler 510 may connect to the indicated server 250, on behalf of the mobile device, through a second socket. Socket handler 510 may then relay any data that is received, over the first and second socket, to the corresponding mobile device 230 and/or server 250.

In some implementations, socket handler 510 may continuously monitor the socket connections to server 250 and attempt to reconnect when a socket connection fails.

Socket state storage 520 may store state information, or other information, relating to the socket connections that are maintained by socket handler 510. Socket state storage 520 may store, for example, window sizes, sequence numbers (e.g., transmission control protocol (TCP) sequence numbers when the socket is a TCP socket), acknowledgement numbers, or other information relating to the state of a socket. For each socket, socket state storage 520 may also store identification information relating the socket to the mobile device 230 and/or server 250 with which the socket connects. For example, each socket may be identified by the remote IP address and port number, or by the four values: source IP address of the socket, source port number of the socket, destination IP address of the socket, and destination port number of the socket. The identification information may be used to lookup the state of a particular socket connection.

In some implementations, socket state storage 520 may only store state information for the sockets associated with servers 250 (i.e., the socket connections between continuity server 240 and server 250). Storing state information only for the sockets associated with servers 250 may be sufficient, as only these socket connections may need to be kept active and connected to a mobile device 230 that switches wireless local area networks 210.

Through socket handler 510 and socket state storage 520, continuity server 240 may act as a proxy or intermediary relay between mobile devices 230 and servers 250. In some implementations, continuity server 240 may simultaneously act as an intermediary for multiple mobile devices 230 and servers 250. In some implementations, a single mobile device 230 may simultaneously connect to multiple servers 250 using multiple socket connections. In this situation, continuity server 240 may act as a relay for each of the multiple socket connections. The operation of continuity server 240 will be described in more detail below with reference to the flow chart of FIG. 8.

Although FIG. 5 shows example functional components of continuity server 240, in other implementations, continuity server 240 may include fewer functional components, different functional components, differently arranged functional components, or additional functional components than depicted in FIG. 5. Alternatively, or additionally, one or more functional components of continuity server 240 may perform one or more other tasks described as being performed by one or more other components of continuity server 240.

Figure 6:
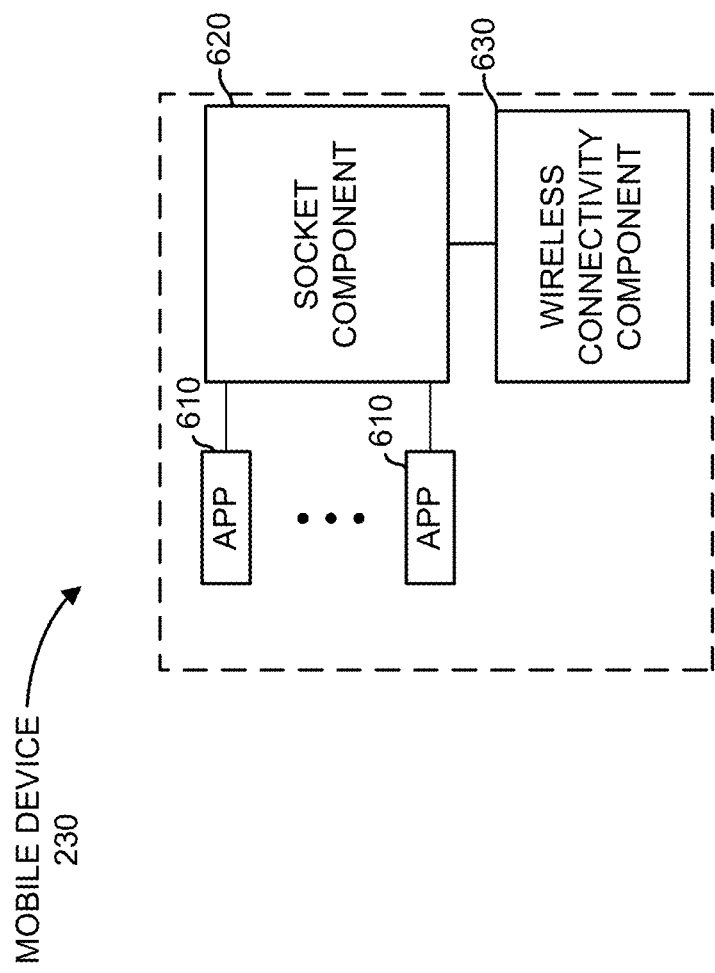
FIG. 6 is a diagram conceptually illustrating example components that may be included in mobile devices.

FIG. 6 is a diagram conceptually illustrating example functional components that may be included in a mobile device 230. As shown, a mobile device 230 may include one or more applications 610, a socket component 620, and a wireless connectivity component 630.

Applications 610 may include software applications installed on mobile device 230. Applications 610 may include, for example, web browser applications, games, utilities, productivity applications, or other applications that use network resources, such as resources provided by servers 250. Applications 610 may initiate network sessions with servers 250, such as socket-based sessions.

Socket component 620 may perform network socket related functionality for mobile device 230. A network socket may represent an endpoint of inter-process communication flow across a network. In some implementations, socket component 620 may relate to the generation of IP sockets. A socket may be defined by a combination of a pair of IP addresses and a port numbers that define the two end-points of the socket. In some implementations, a transport protocol type, such as TCP, user datagram protocol (UDP), raw IP, or other protocol types may further define a socket. In some implementations, the functionality of socket component 620 may be implemented as part of low-level (e.g., an operating system level) networking resources. Alternatively or additionally, the functionality of socket component 620 may be implemented at a higher level, such as at the application level.

In some implementations, socket component 620 may receive a network request from applications 610. The network request may include a request to initiate a socket connection with a server 250. Socket component 620 may reformat and/or redirect the request to continuity server 240. For example, socket component 620 may receive a socket request, from an application 610, for a first one of servers 250. Socket component 620 may initiate a socket connection with continuity server 240 and then transmit the IP address of the first one of servers 250 (or other identification information for the first one of servers 250) to continuity server 240. In this manner, the operation of continuity server 240 may be transparent from the point-of-view of applications 610.

In other possible implementations, the above-described functionality of socket component 620 may be implemented by applications 610. For example, applications 610 may choose, on a per-network socket request basis, whether to use or not to use the services of continuity server 240. For a network socket request that is to be handled by continuity server 240, the corresponding application 610 may initiate a socket connection with continuity server 240 and then transmit the IP address of the destination server 250 (or other identification information for the server 250) to continuity server 240. For a network socket request that is not to be handled by continuity server 240, application 610 may directly initiate the socket connection with the destination server 250.

Wireless connectivity component 630 may manage the connectivity of mobile device 230 to wireless local area networks 210. Wireless connectivity component 630 may, for example, detect when mobile device 230 is disconnected from a wireless local area network 210; scan for wireless local area networks 210 that are in range of mobile device 230; and connect to wireless local area networks 210 that is determined to be in range and when hardware resources of mobile device 230, relating to wireless connectivity, are available. Wireless connection component 630 may provide the connectivity state of mobile device 230 (e.g., currently connected or not connected to a wireless local area network) to socket component 620.

Although FIG. 6 shows example functional components of a mobile device 230, in other implementations, mobile device 230 may include fewer functional components, different functional components, differently arranged functional components, or additional functional components than depicted in FIG. 6. Alternatively, or additionally, one or more functional components of mobile device 230 may perform one or more other tasks described as being performed by one or more other functional components of mobile device 230.

Figure 7:
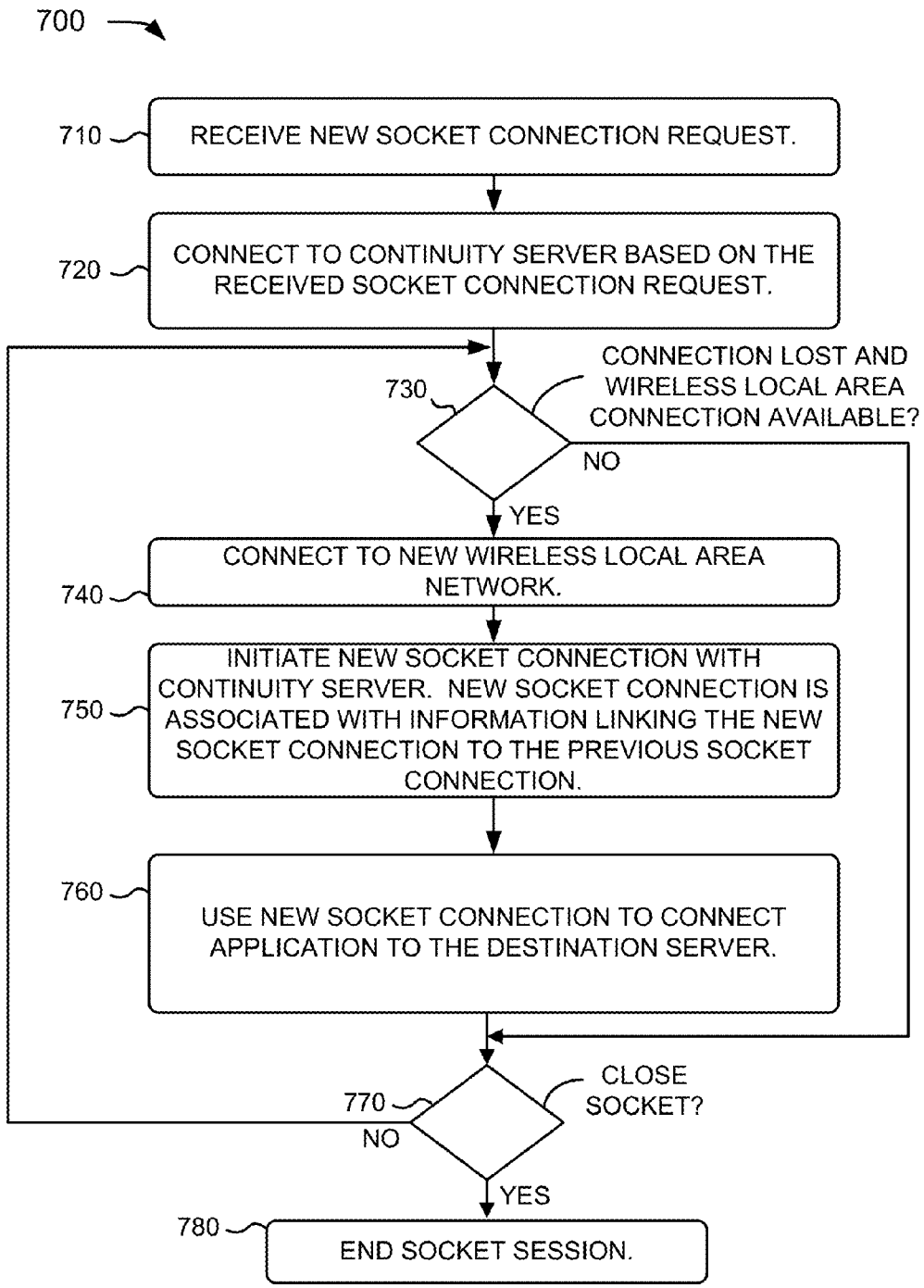
FIGS. 7 and 8 are flow charts of an example process for implementing session continuity.

FIG. 7 is a flow chart of an example process 700 for implementing session continuity. Process 700 may be performed by mobile device 230. Alternatively, or additionally, some or all of process 700 may be performed by another device or group of devices, including or excluding mobile device 230.

As shown in FIG. 7, process 700 may include receiving a new socket connection request (block 710). In one implementation, the new socket connection request may be received, by socket component 620, from an application 610 and may indicate a destination server 250 for the socket request. In some example implementations, the destination server 250 may be specified by both an identifier for the server (e.g., an IP address or fully qualified domain name) and a port number. Destination server 250 may include, for example, a web server or other server to which mobile device 230 may connect.

Process 700 may further include connecting to continuity server 240 based on the received socket connection request (block 720). In one implementation, socket component 620 may initiate a socket connection, with continuity server 240, based on an IP address of continuity server 240 and based on a particular port number, where the port number may refer to a logical port at continuity server 240. The port number may be, for example, a predefined port number that is defined as a constant or other hardcoded value in socket component 620. In an alternative possible implementation, the port number may be a value selected from a range of possible port numbers, such as a value selected based on an account number or other identification value associated with mobile device 230. In another possible implementation, the port number may be assigned, such as by continuity server 240, to mobile devices 230 on a per-mobile device basis.

After connecting to continuity server 240, or as part of an initial connection or handshaking process with continuity server 240, socket component 620, of mobile device 230, may transmit the identification (e.g., IP address and port number) of the destination server 250, to continuity server 240. Mobile device 230 may use the socket connection to continuity server 240 to handle subsequent network communications with destination server 250.

Process 700 may further include determining whether a connection, to a wireless local area network, was lost and whether another wireless local area network is available (block 730). In some implementations, wireless connectivity component 630 may manage connections with local wireless networks 210. Wireless connectivity component 630 may determine when a connection is lost (e.g., due to mobile device 230 moving out of range of the wireless local area network). Wireless connectivity component 630 may automatically attempt to reconnect to an available wireless local area network 210 whenever a connection to one of wireless local area networks 210 is lost or when a current connection to a wireless local area network 210 is weak and another wireless local area network 210 is available. Reconnection to a wireless local area network may mean that mobile device 230 is assigned a new IP address by the new wireless local area network.

Process 700 may further include, when the current wireless local area network connection is lost and another wireless local area network is available (block 730—YES), connecting to the new wireless local area network (block 740). Wireless connectivity component 630 may, for example, initiate a wireless network connection with an available wireless local area network. The available wireless local area network may include, for example, public hotspots, private wireless networks in which a mobile device has been previously authorized, or other wireless networks.

Process 700 may further include initiating a new socket connection with continuity server 240 (block 750). The new socket connection may be associated with information linking the new socket connection to the previous socket connection (block 750). In one implementation, the information linking the new socket connection to the previous socket connection may be based on a sequence value that is associated with the socket connections. For example, continuity server 240 may transmit an initial sequence value to each mobile device 230, where different mobile devices 230 may receive different sequence values that are offset from one another by at least a minimum quantity. The first socket connection by a mobile device 230, to continuity server 240, may be associated with the initial sequence value and subsequent socket connections by the mobile device 230 may each be incremented by a particular quantity (e.g., one). In this manner, continuity server 240 may be able to associate new socket connections with previous socket connections that are part of the same logical session. The sequence values may be transmitted after the initial socket connection to continuity server 240, or as part of an initial connection or handshaking process, during the socket connection, with continuity server 240.

In another possible implementation, instead of transmitting the sequence values, that identify the sockets, as an independent value, the sequence values may be extracted or otherwise encoded as part of the normal socket connection parameters. For example, different mobile devices 230, and potentially different connections associated with the same mobile device 230, may be assigned different ports for connecting to continuity server 240. Subsequent socket connections for the same logical network session may use the same port or may use a port value that is incremented by a particular quantity (e.g., one).

In general, a number of different techniques may be used to communicate, from mobile device 230 to continuity server 240, that a particular socket connection is related to the same logical network session as a previous socket connection. Techniques to perform this function, in addition to or in the alternative to the examples given above, may alternatively be used.

Process 700 may further include using the new socket connection to connect application 610 to the destination server 250 (block 760). From the perspective of application 610 and/or server 250, the change in wireless local area networks may be transparent. In other words, application 610 may be insulated from the change in wireless local area networks and communications between application 610 and server 250 may continue uninterrupted.

At some point, the socket connections between mobile device 230 and server 250 may close. A socket connection may be closed, for example, by application 610. Alternatively, continuity server 240 may close a socket connection in response to the corresponding socket connection being closed by server 250.

Process 700 may further include determining whether the socket is closed or is to be closed (block 770). When it is determined to close the socket (block 770—YES), process 700 may include ending the socket session (block 780). Socket component 620 may, for example, close the socket and free resources, of mobile device 230, relating to the socket.

When the socket is not determined to be closed (block 770—NO), process 700 may continue to block 730.

Figure 8:
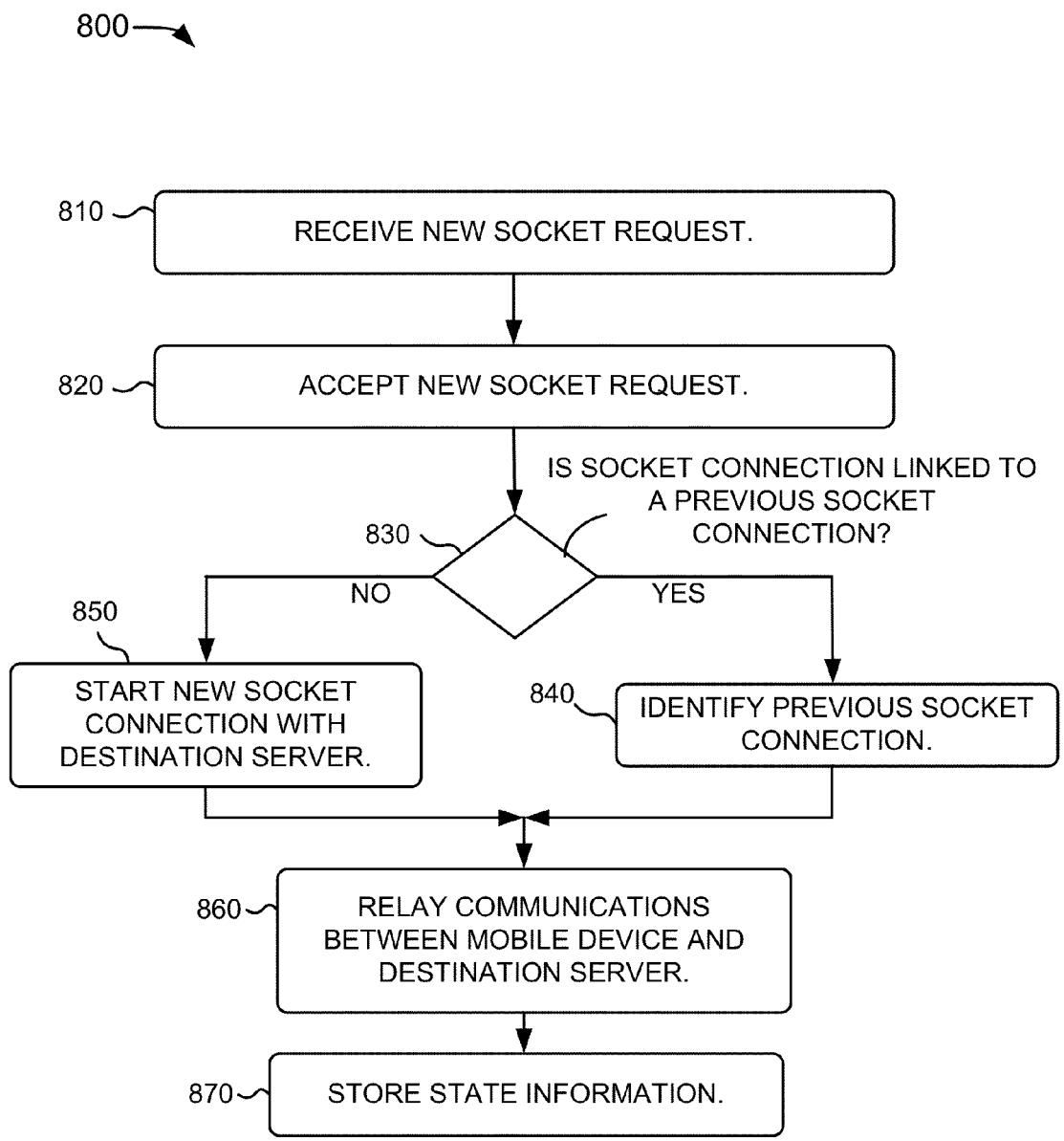

FIG. 8 is a flow chart of an example process 800 for implementing session continuity. In one implementation, process 800 may be performed by continuity server 240. Alternatively, or additionally, some or all of process 800 may be performed by another device or group of devices, including or excluding continuity server 240.

As shown in FIG. 8, process 800 may include receiving a new socket connection (block 810). In one implementation, continuity server 240 may continuously listen (or otherwise detect) new socket requests from mobile devices 230. For example, a thread or process, associated with socket handler 510 of continuity server 240, may continuously monitor logical ports of continuity server 240 for new socket requests from mobile devices 230.

When a socket request is received, process 800 may further include accepting the socket request (block 820). As previously mentioned, in some implementations, accepting the socket request may include receiving information linking the socket connection to a previous socket connection and/or additionally receiving an indication of a destination server 250 associated with the socket request. For instance, a sequence value, relating to the new socket connection, may be received from mobile device 230. The sequence value may be an explicit value that is transmitted by mobile devices 230 or the sequence value may be a value that is encoded based on other parameters that are associated with a socket request, such as a port number.

Process 800 may further include determining whether the socket connection is linked to a previous socket connection (block 830). In one implementation, socket handler 510 may determine whether the socket connection is linked to a previous socket connection based on the presence of the linking information.

When the linking information is present, and/or the linking information indicates that the new socket connection corresponds to a reconnection of a previous socket connection (block 830—YES), process 800 may further include using the linking information to identify the corresponding previous socket connection with mobile device 230 (block 840). By identifying the previous socket connection with mobile device 230, the corresponding socket connection between continuity server 240 and server 250 may be determined, such as through a lookup operation into socket state storage 520. In one implementation, socket handler 510 may use the linking information to identify the state associated with the socket between continuity server 240 and server 250, such as the state stored by socket state storage 520. As previously mentioned, the state may be defined by information relating to, for example, window sizes, sequence numbers, acknowledgement numbers, or other information relating to a socket. In some implementations, the linking information may be used to directly look up the corresponding socket connection between continuity server 240 and server 250, potentially without explicitly identifying the previous socket connection.

When the new socket connection, from block 820, is determined to not be linked to a previous socket connection (block 830—NO), process 800 may further include starting a new socket connection with destination server 250 (block 850). The socket corresponding to the socket accepted in block 820 and the socket started in block 850 may be used by continuity server 240 to connect mobile device 230 to the destination server 250. In some implementations, information regarding the new socket connection may be stored in socket state storage 520.

Process 800 may further include relaying communications between mobile device 230 and destination server 250 (block 860). For example, when the new socket request corresponds to a socket session linked to a previous socket session (block 840), continuity server 240 may continue the network connection between mobile device 230 and destination server 250 by using the new socket connection (from block 820) to take the place of the previous socket connection to mobile device 230. The previous socket connection may correspond to the socket connection that was disconnected when mobile device switched wireless local area networks 210. When, however, the new socket request corresponds to a socket session that is not linked to a previous socket session (block 850), continuity server 240 may begin to relay communications between mobile device 230 and destination server 250 via the new socket connection.

Process 800 may further include storing state information (block 870) corresponding to the communications relayed between mobile device 230 and destination server 250. For example, socket state storage 520 may store TCP sequence numbers, acknowledgement numbers, or other information relating to the state of a socket.

Figure 9:
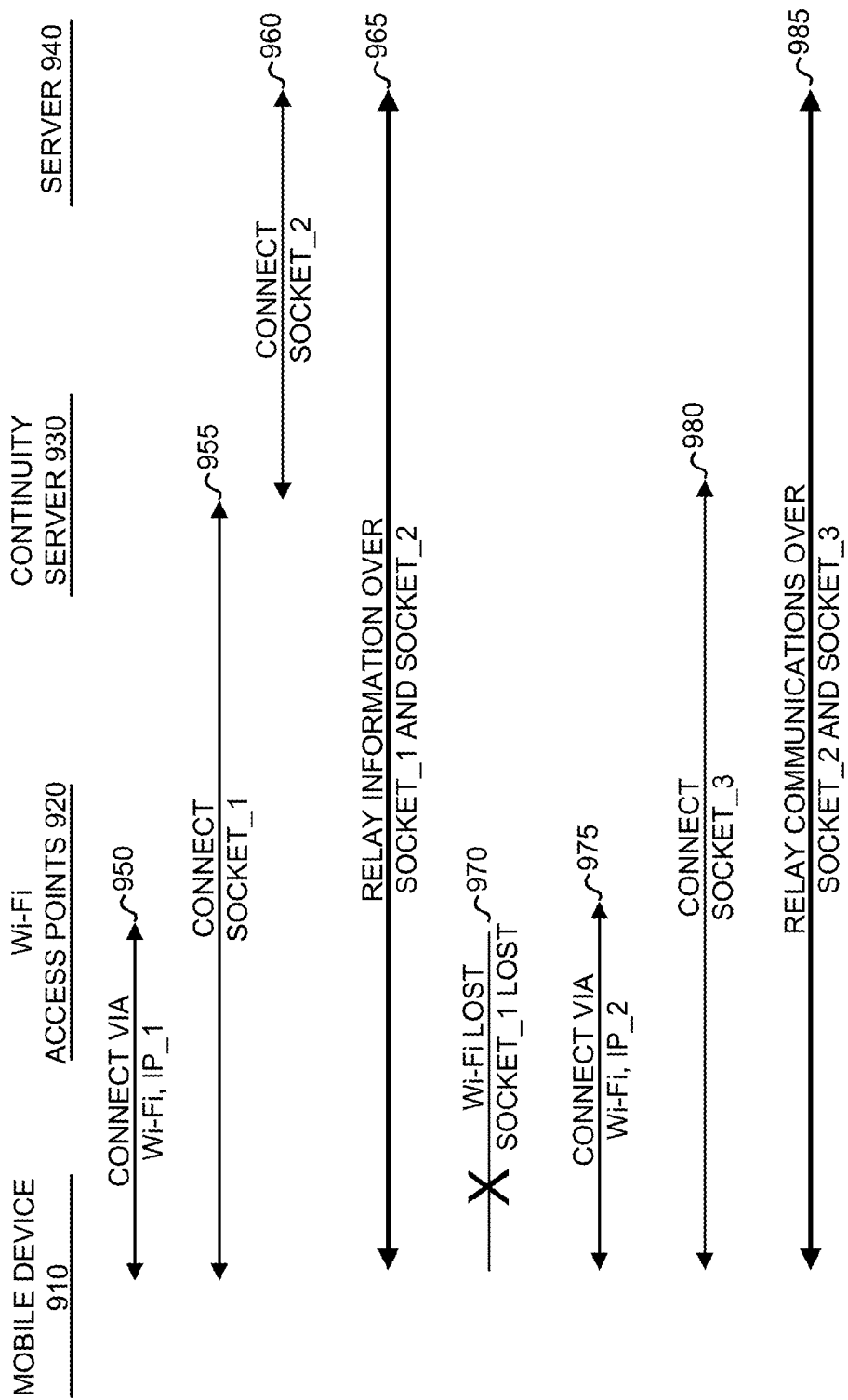

FIG. 9 is a diagram illustrating an example of communications, between devices in environment 200, relating to session continuity of mobile devices. As shown in FIG. 9, the example communications may occur between a mobile device 910, Wi-Fi access points 920, a continuity server 930, and a server 940. Mobile device 910, Wi-Fi access points 920, continuity server 930, and server 940 may correspond to a mobile device 230, access points 215, continuity server 240, and a server 250, respectively, as illustrated in FIG. 2.

Mobile device 910, when in range of a Wi-Fi network, such as one of wireless local area networks 210, may connect to the network. As illustrated, mobile device 910 may connect to a Wi-Fi access point 920 (communication 950). Mobile device 110 may be assigned a first IP address (IP__1) by Wi-Fi access point 920.

At some point, mobile device 910 may receive a request to connect to server 940, such as a web server or other type of server. For example, an application at mobile device 910, such as a web browser, may receive a request to obtain a web page from server 940. Instead of directly connecting to server 940, the web browser, or another component of mobile device 910, such as socket component 620, may connect to continuity server 930 (communication 955, connect SOCKET__1). In response, continuity server 930 may create a second socket connection (SOCKET__2) to server 940 (communication 960). Continuity server 930 may use SOCKET__1 and SOCKET__2 to subsequently relay information between mobile device 910 and server 940 (communication 965). Continuity server 930 may additionally store the state of at least SOCKET__2. From the standpoint of applications at mobile device 910 and/or server 940, the operation of continuity server 930, when relaying information over SOCKET__1 and SOCKET__2, may be transparent. In other words, neither the applications at mobile device 910 nor server 940 may be aware of the presence of continuity server 930.

At some point, assume that the connection between mobile device 910 and Wi-Fi access point 920 is broken. For example, device 910 may be moved out of the wireless range of Wi-Fi access point 920, radio interference may cause the connection to be broken, and/or a problem at Wi-Fi access point 920 may cause the connection to be broken. In this situation, SOCKET__1 may be terminated (communication 970).

If another wireless local area network is within range, mobile device 910 may connect to another one of Wi-Fi access points 920 (communication 975). Mobile device 910 may be assigned a second IP address (IP__2) by this Wi-Fi access point 920.

Mobile device 910 may reconnect to continuity server 930 via a third socket connection (SOCKET__3) (communication 980). Mobile device 910 may transmit linking information to continuity server 930 to enable continuity server 930 to identify the new socket connection (SOCKET__3) as being a continuation of the previous socket connection (SOCKET__1). As previously discussed, the linking information may include a socket sequence number (or other identifying information) that is explicitly transmitted as part of the connection of mobile device 910 with continuity server 240 or that is implicitly transmitted, such as being encoded using other parameters (e.g., port numbers) relating to the socket connection.

Continuity server 940 may use SOCKET__2 and SOCKET__3 to subsequently relay information between mobile device 910 and server 940 (communication 985).

FIG. 10 is a diagram illustrating an example of communications, between devices in environment 200, relating to session continuity of mobile devices. The communications shown in FIG. 10 may be similar to those shown in FIG. 9. In FIG. 10, however, assume a 3G/4G cellular network is particularly used to connect access points 215 to continuity server 240 and servers 250. As shown in FIG. 10, the example communications may occur between a mobile device 1010, a Wi-Fi access point 1020, a 3G/4G cellular network 1030, a continuity server 1040, and a server 1050. Mobile device 1010, Wi-Fi access points 1020, continuity server 1040, and server 1050 may correspond to a mobile device 230, Wi-Fi access points 215, continuity server 240, and a server 250, respectively, as illustrated in FIG. 2. The 3G/4G cellular network 1030 may correspond to an implementation in which access points 215 may connect to a broadband network using cellular broadband (e.g., as illustrated for wireless local area network 210-N in FIG. 2). For example, 3G/4G cellular network 1030 may correspond to core network 220 in an implementation in which access points 215 connect to core network 220 via a cellular broadband connection.

Mobile device 1010, when in range of a Wi-Fi network, such as one of wireless local area networks 210, may connect to the network. As illustrated, mobile device 1010 may connect to Wi-Fi access point 1020 (communication 1055). Mobile device 110 may be assigned a first IP address (IP__1) by Wi-Fi access point 1020.

At some point, mobile device 1010 may receive a request to connect to server 1050, such as a web server or another type of server. For example, an application of mobile device 1010, such as a web browser, may receive a request to obtain a web page from server 1050. Instead of directly connecting to server 1050, the web browser, or another component of mobile device 1010, such as socket component 620, may connect, using 3G/4G cellular network 1030 or a broadband access network, to continuity server 1040 (communication 1060). In response, continuity server 1040 may create a second socket connection (SOCKET__2) to server 1050 (communication 1065). Continuity server 1040 may use SOCKET__1 and SOCKET__2 to subsequently relay information between mobile device 1010 and server 1050 (communication 1070). Continuity server 1040 may additionally store the state of at least SOCKET 2. From the standpoint of mobile device 1010 and/or server 1050, the operation of continuity server 1040, when relaying information over SOCKET_1 and SOCKET 2, may be transparent.

At some point, assume that the connection between mobile device 1010 and Wi-Fi access point 1020 is broken. For example, device 1010 may be moved out of the wireless range of Wi-Fi access point 1020, radio interference may cause the connection to be broken, and/or a problem at Wi-Fi access point 1020 may cause the connection to be broken. In this situation, SOCKET_1 may be terminated (communication 1075).

If another wireless local area network is within range, mobile device 1010 may connect to another access point 1020 (communication 1080). Mobile device 1010 may be assigned a second IP address (IP_2) by this access point.

Mobile device 1010 may reconnect, over 3G/4G cellular network 1030, to continuity server 1040 via a third socket connection (SOCKET_3) (communication 1085). Mobile device 1010 may transmit linking information to continuity server 1040 to enable continuity server 1040 to identify the new socket connection (SOCKET_3) as being a continuation of the previous socket connection (SOCKET_1).

Continuity server 1040 may use SOCKET_2 and SOCKET_3 to subsequently relay information between mobile device 1010 and server 1050 (communication 1090). Continuity server 1040 may additionally store the state of at least SOCKET_2.

Systems and/or methods described herein may provide for session continuity for mobile devices traversing wireless local area networks.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method implemented by a device, the method comprising:
   receiving, by the device, a first request from a mobile device to create a first socket connection between the mobile device and the device,
      the first request being received from the mobile device via a first wireless local area network;
   initiating, by the device, the first socket connection between the mobile device and the device;
   initiating, by the device and after initiating the first socket connection, a second socket connection between the device and a server device;
   relaying, by the device, first communications between the mobile device and the server device using the first socket connection and the second socket connection;
   receiving, by the device and from the mobile device, a second request to create a third socket connection between the device and the mobile device,
      the second request including linking information that associates the third socket connection with the first socket connection, and
      the second request being received via a second wireless local area network;
   initiating, by the device, the third socket connection based on the second request;
   determining, by the device, that the third socket connection is linked to the first socket connection based on the linking information; and
   relaying, by the device, second communications between the mobile device and the server device, using the third socket connection and the second socket connection based on the third socket connection being linked to the first socket connection.

2. The method of claim 1, further comprising:
   receiving, from the mobile device, information identifying the server device; and
   where initiating the second socket connection includes:
      initiating, based on the information identifying the server device, the second socket connection between the device and the server device.

3. The method of claim 1, further comprising:
   storing state information relating to the second socket connection between the device and the server device.

4. The method of claim 3, where the state information includes at least one of:
   a window size relating to the second socket connection between the device and the server device,
   a sequence number relating to the second socket connection between the device and the server device, or
   an acknowledgement number relating to the second socket connection between the device and the server device.

5. The method of claim 1, where the first wireless local area network includes a first Wi-Fi network, and
   where the second wireless local area network includes a second Wi-Fi network.

6. The method of claim 1, where the linking information includes:
   a sequence value that is associated with the first socket connection between the mobile device and the device; or
   a value that is determined based on a port number associated with the first socket connection between the mobile device and the device.

7. A device, comprising:
a processor to:
receive a first request from a mobile device, to create a first socket connection between the mobile device and the device,
the first request being received from the mobile device after the mobile device connects to a first wireless local area network;
initiate, based on the first request, the first socket connection and a second socket connection between the device and a server device;
relay first communications between the mobile device and the server device using the first socket connection and the second socket connection;
receive, from the mobile device, a second request to create a third socket connection between the mobile device and the device,
the request being associated with linking information that links the third socket connection with the first socket connection, and
the second request being received from the mobile device after the mobile device disconnects from the first wireless local area network and connects to a second wireless local area network;
identify, based on the linking information, the second socket connection between the device and the server device; and
relay second communications, between the mobile device and the server device, using the third socket connection between the mobile device and the device and the second socket connection between the device and the server device.

8. The device of claim 7, where the processor is further to:
receive, from the mobile device, information identifying the server device; and
where, when initiating the second socket connection, the processor is to:
initiate, based on the information identifying the server device, the second socket connection between the device and the server device.

9. The device of claim 7, where the processor is further to:
store state information relating to the second socket connection between the device and the server device.

10. The device of claim 9, where the state information includes at least one of:
a window size relating to the second socket connection between the device and the server device,
a sequence number relating to the second socket connection between the device and the server device, or
an acknowledgement number relating to the second socket connection between the device and the server device.

11. The device of claim 7, where the first wireless local area network includes a first Wi-Fi network, and
where the second wireless local area network includes a second Wi-Fi network.

12. The device of claim 7, where the linking information includes:
a sequence value that is associated with the first socket connection between the mobile device and the device; or
a value that is determined based on a port number associated with the first socket connection between the mobile device and the device.

13. A method comprising:
receiving, by a device that receives network connectivity through a first wireless local area network, a request to connect to a first server;
connecting, by the device and based on the request, to a second server, different than the first server, via a first socket connection;
providing, by the device, information identifying the first server to the second server,
a second socket connection, between the second server and the first server, being created based on providing the information identifying the first server to the second server;
communicating, by the device, with the first server through the first socket connection and the second socket connection as part of a communication session between the device and the first server;
detecting, by the device, a loss of connection to the first wireless local area network;
connecting, by the device and based on the loss of connection, to a second wireless local area network,
the second wireless local area network being different from the first wireless local area network;
connecting, by the device, to the second server via a third socket connection and using the second wireless local area network;
transmitting, by the device, linking information, to the second server, that links the third socket connection with the first socket connection; and
communicating, by the device and based on transmitting the linking information to the second server, with the first server through the third socket connection and the second socket connection without interrupting the communication session.

14. The method of claim 13, where the first wireless local area network includes a first Wi-Fi network, and
where the second wireless local area network includes a second Wi-Fi network.

15. The method of claim 13, where the linking information includes:
a sequence value that is associated with the first socket connection; or
a value that is determined based on a port number associated with the first socket connection.

16. The method of claim 13, where the request to connect to the first server is received from an application executing on the device, the method further comprising:
communicating, with the first server, through the first socket connection and the second socket connection, to insulate the application from the loss of connection to the first wireless local area network.

17. A device, comprising:
a processor to:
receive a request to connect to a first server using a first wireless local area network for network connectivity of the device;
connect, based on the request, to a second server, different than the first server, via a first socket connection;
provide information identifying the first server to the second server,
a second socket connection, between the second server and the first server, being created based on providing the information identifying the first server to the second server;
communicate with the first server through the first socket connection and the second socket connection as part of a communication session between the device and the first server;
detect a loss of connection to the first wireless local area network;

connect, based on the loss of connection, to a second wireless local area network,
the second wireless local area network being different than the first wireless local area network;
connect to the third server via a third socket connection and using the second wireless local area network,
when connecting to the second server, the processor is to:
transmit linking information, to the second server, that links the third socket connection with the first socket connection; and
communicate, based on transmitting the linking information to the second server, with the first server through the third socket connection and the second socket connection without interrupting the communication session.

18. The device of claim 17, where the first wireless local area network includes a first Wi-Fi network, and where the second wireless local area network includes a second Wi-Fi network.

19. The device of claim 17, where the linking information includes:
a sequence value that is associated with the first socket connection; or
a value that is determined based on a port number associated with the first socket connection.

20. The device of claim 17, where the request to connect to the first server is received from an application executing at the device, and
where the processor is further to:
communicate, with the first server, through the first socket connection and the second socket connection, to insulate the application from the loss of connection to the first wireless local area network.

* * * * *